Sept. 13, 1955  V. EGLITIS  2,717,812
AUTOMATIC SILO UNLOADER
Filed Feb. 23, 1954  3 Sheets-Sheet 1

INVENTOR.
Victors Eglitis
BY
Gustav Miller
ATTORNEY

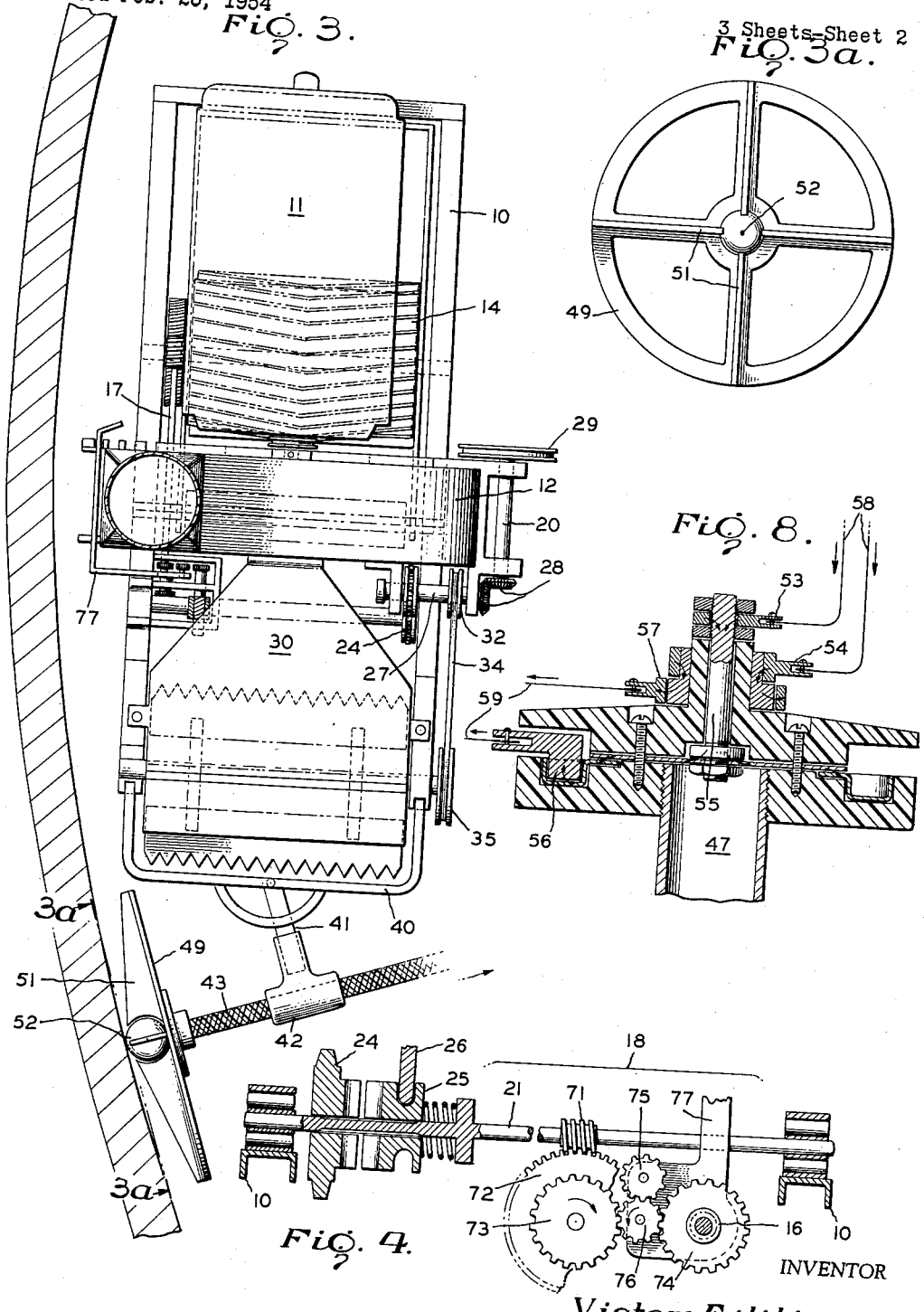

Sept. 13, 1955            V. EGLITIS            2,717,812
AUTOMATIC SILO UNLOADER
Filed Feb. 23, 1954            3 Sheets-Sheet 3
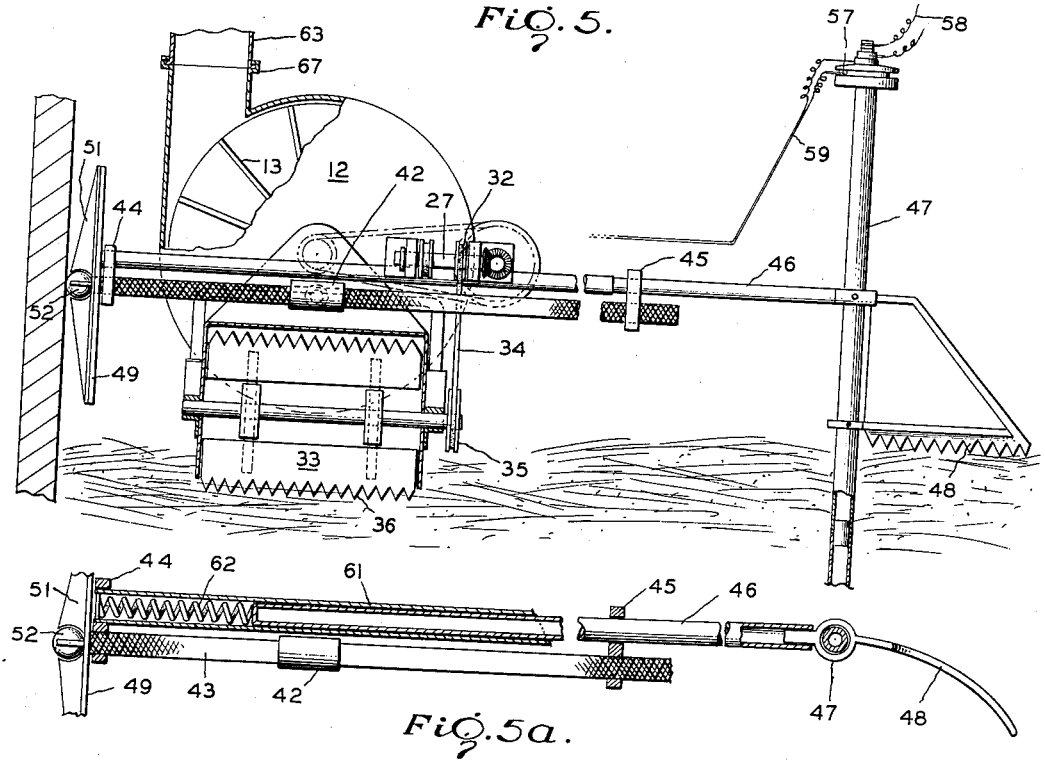
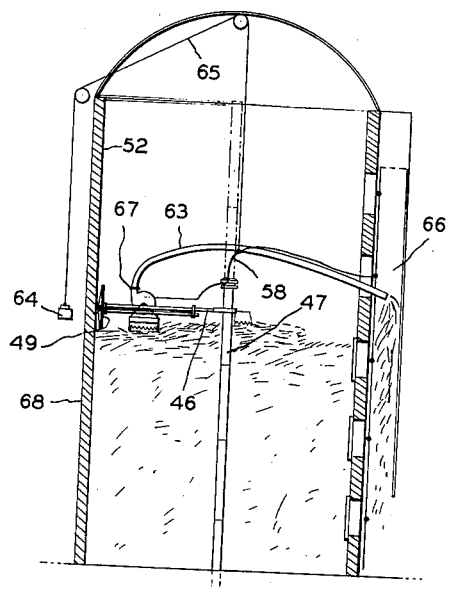
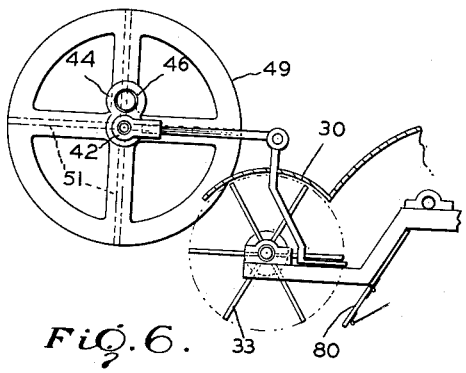
INVENTOR
*Victors Eglitis*
BY *Gustave Miller*
ATTORNEY

United States Patent Office 2,717,812
Patented Sept. 13, 1955

2,717,812

AUTOMATIC SILO UNLOADER

Victors Eglitis, Chicago, Ill.

Application February 23, 1954, Serial No. 411,614

10 Claims. (Cl. 302—56)

The present invention relates generally to a self propelled mobile pick-up and conveying device for loose materials such as fodder, silage, straw, hay, and similar materials.

It has for its primary object to provide a light weight and self propelled machine which may be operated in a silo of round shape and on top of the stacked forage or fodder.

Another object is to provide such a machine that when placed on the fodder in the silo will operate without attendance of any sort and will automatically dig, loosen, lift and by means of a blower convey the loosened fodder to a conduit which may lead to the stalls of the cattle or to another conveyance for the purpose of hauling.

A still further object of the invention is to provide such a machine that will automatically dig and loosen the material in the silo in circles around the inside and on top of the material so as to remove the material evenly over the whole stack within the silo.

Yet a still further object is to provide a machine having a single power unit which drives the fodder loosening device, the blower of which transports the fodder to the conduit, and also the motive power for the apparatus to drive it in increasing and decreasing circles around the silo.

Another object of the invention is to provide an adjustment on the machine for raising or lowering the loosening part of the machine so that fodder of different degrees of compactness or different materials (grass, corn, etc.) may be readily and efficiently handled. The single motor operates a blower fan by direct drive and a main drive wheel or roller by a gear and belt connection, while at the same time driving a toothed or pronged wheel which engages the fodder and lifts it to the blower.

The machine may also be used manually when desired and when it becomes necessary to dislodge ensilage which is frozen against the silo wall, there being sometimes sufficient moisture in the ensilage and sometimes due to condensation to freeze a band of ensilage next to the wall. When so used, a front door or plate covering the pronged wheel is raised and the machine is run up against the frozen material and by altering the effective height of the digging wheel, the ensilage is picked up and blown out the conduit. The invention has a cross-thread screw in a horizontally rotating arm pivoted to a pipe support placed centrally in the silo before filling. This arm is driven by the rotation of the machine around the silo and further provides means of scraping compacted fodder from the wall of the silo, fodder which would ordinarily be missed by the loosening wheel. Means is also provided in the arm for automatically adjusting the arm's length to the true radius of the silo, in cases of out-of-round construction, which is frequently encountered.

The advantages and objects of the invention will be more clearly apparent from the following description when taken in connection with the annexed drawings in which like numerals indicate like parts throughout the several views, and in which:

Fig. 3 is a top view of the present invention showing its guide wheel and arm and a portion of the wall of a silo.

Fig. 3a is a plan view of the guide wheel.

Fig. 4 is a schematic rear view partly in section of the drive shaft and clutch.

Fig. 5 is a front view partly in section showing the cross screw arm and guide wheel, with a portion of the central pipe support.

Fig. 5a is a fragmentary view in section of the arm.

Fig. 6 is a side view in elevation of the arm with portions of the frame and fodder pickup wheel.

Fig. 7 is a view in section partially schematic showing the invention at work in a silo, and Fig. 8 shows a cross-sectional view of the electrical swivel in place on the top of the central support pipe.

Figure 1:
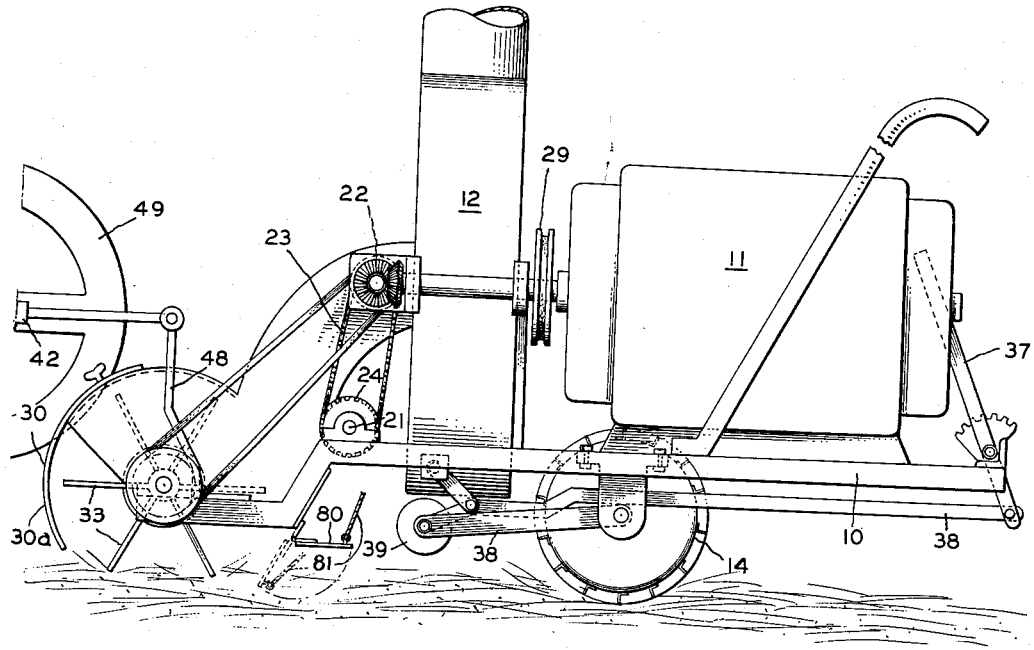
Fig. 1 is a side view in elevation of the present invention.
Figure 2:
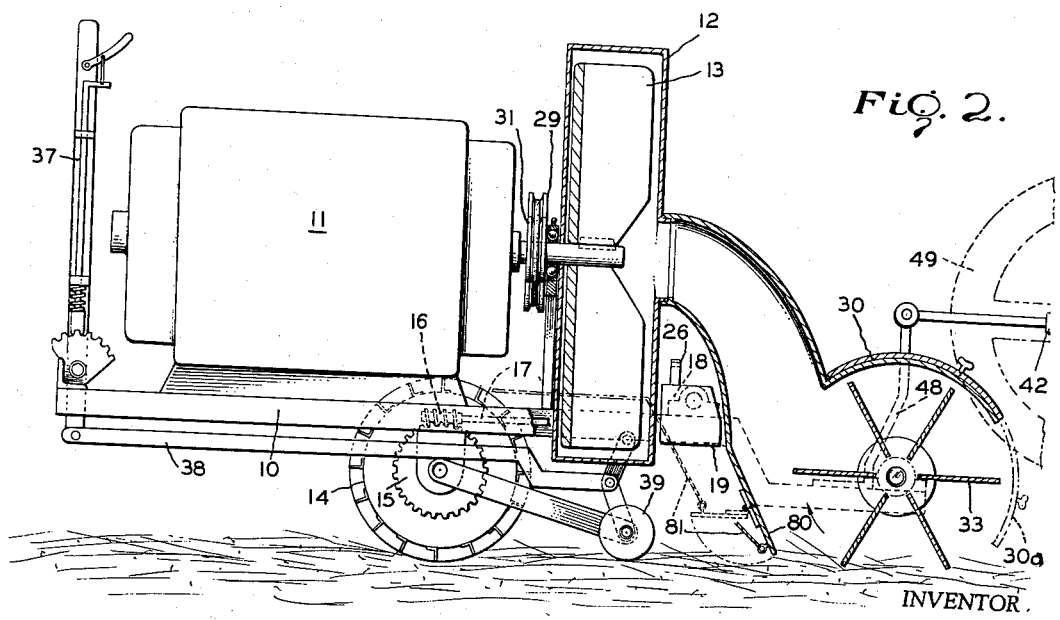
Fig. 2 is a view in elevation of the other side of the machine.

Referring in more detail to the drawings, it will be seen that in Figs. 1 and 2, frame 10 supports an electric motor 11, a blower housing 12 in which is the fan 13. A main drive wheel or traction roller 14 is driven by spur gear 15 and worm gear 16 on a shaft 17, which is drivably connected to the gear cluster 18 seen in Fig. 4 in detail and within housing 19 in Fig. 2. The cross shaft 21 shown in the view from the rear in Fig. 4 is driven by the sprocket 22 and chain 23 and second sprocket 24 with clutch 25 interposed. A short lever 26 seen in Figs. 2 and 4 controls the clutch, although the leverage or handle is not shown. A short shaft 27 driving sprocket 24 is in turn driven by bevel gears 28 and pulleys 29 and 31 driven by motor 11. Pulley 32 on the short shaft 27 drives the pickup wheel 33 in housing 30 by means of belt 34 and pulley 35. The pickup wheel 33 has teeth 36 and is supported by frame 10. A lever 37 at the rear of the frame 10 is adjustably connected by linkage 38 to the secondary roller 39, so that adjustment of the depth of contact of the pickup wheel 33 may be made relative to the surface of the fodder.

Pivotally secured to each side of frame 10 at the front end is an upwardly extending U-shaped draw bar 40 with a horizontally pivoted hitch indicated generally at 41, and as seen in Fig. 3 is connected at the front end of the machine, but may be also connected at the rear of the machine by fastening it to the frame 10.

In Figs. 3, 5 and 5a, the hitch 41 will be seen to be an internally cross threaded screw follower 42 traveling on the cross threaded screw 43 which is supported by bearings 44 and 45 at each end of the radial arm 46. A central pipe support 47 slidably supports the radial arm 46 and the rake 48 which pulls fodder from the vicinity of the pipe support 47 as it rotates. On the outside end of the screw 43 is the screw drive wheel 49 having blades 51 as seen in Fig. 3a and a bearing ball 52 loosely secured within the ends of the blades 51. The screw drive wheel 49 is rotated by frictional contact with the silage over which it is rolling, thus serving to rotate the cross threaded screw 43 which in turn actuates the screw follower 42. On the upper end of the pipe support 47, as seen in Figs. 5 and 8, is the commutator unit for transferring the electrical energy from the cable 58 to the machine through cable 59, the cable 58 being connected externally of the silo by suitable switches not here shown as a part of the invention. A central bolt 55 is connected by the connector 53 to one side of the supply cable 58 and the other side connects to connector 54 which transfers the current to the machine by means of the ring 57, the current returning to the bolt 55 by means of the rotating contact 56.

The radial arm 46 is seen in Fig. 5a to have a telescoping outer section 61 with a spring 62 biasing the end toward the silo wall. This permits the sliding of the screw in bearing 45 and accommodates walls of silos which are for one reason or another imperfectly round. Blower housing 12 is connected to a flexible conduit 63, shown in Fig. 7 counterbalanced by the weight 64 on cable 65 and discharging into the conduit 66. When the silo is empty, the machine can be suspended by means of cable 65, shown in Fig. 7, and out of the way while the silo is being refilled. A swivel connection 67 seen in Fig. 5 permits continuous rotation of the machine within the silo 68.

The diameter of the drive wheel 49 and the cut of the lead screw 43 is computed so that when the machine makes one round around the silo the following 42 is moved to one side the width of the wheel 33. The drive wheel 49 serves to remove fodder packed too closely to the wall and to spill it as far inward as necessary to be caught by the pickup wheel 33. Similarly, the height and length of the rake 48 is made so that the fodder left in the center due to the lack of short turning radius is swept outwardly to where it is run over by the pickup wheel 33.

The gear cluster 18 is seen to have cross shaft 21 driving by means of worm 71 the gears 72, 73, and drive gear 74 through the planetary gears 75 and 76 which are pinioned on bracket 77 for movement between forward and reverse operation, in the conventional manner.

In operation, the first section of the pipe support is erected in the silo before the ensilage is piled in and compacted and is never taken out. The machine of this invention is placed in the silo on top of the compacted ensilage or fodder and is guided in circles around and around the silo, the wheel with its loosely arranged ball being pressed against the wall and by the telescoping section in the radial arm, is kept in contact with the wall, the blades on the wheel knocking down any ensilage stuck thereon, and the wheel moving it to a place where it is swept into the blower.

The rake on the inner end of the arm sweeps fodder outwardly away from the pipe because of the short turning radius of the machine so close to the pipe. The rake at least partially supports the radial arm in height over the fodder, preventing binding of the arm on the pipe and maintaining a comparatively flat surface on the ensilage stack. The machine may be reversed by moving the bracket 77 supporting the planetary gears, the door 80 being connected to the bracket 77 by flexible cable 81 which automatically raises the door when the reverse action is wanted, as shown in Fig. 2, with the housing cover 30a then being closed, as indicated in dotted lines in Fig. 2.

While a single embodiment has been here illustrated and described, many changes and modifications of the invention are contemplated without departing from the spirit and scope of the invention as defined in the appended claims.

What is claimed is:

1. An automatically guided ensilage unloader for round silos comprising a frame, a motor mounted on said frame, a blower housing mounted on said frame, a fan in said blower housing drivably connected to said motor, a traction roller journaled in said frame, a gear train including reversing gears and a clutch connecting said roller to said motor, a pickup wheel journaled in said frame, pulley means drivably connecting said pickup wheel to said motor, a support pipe adapted to be erected centrally in a silo, a radial arm pivoted on said pipe, support bearings on said arm one on the end thereof and the other in spaced relation to said pipe, a cross threaded screw carried in said bearings, a screw driving wheel mounted on the outer end of said screw, a cross thread follower slidably mounted on said screw, hitch means connecting said follower to said frame, and a flexible conduit pivotally mounted on said blower housing and adapted to convey blown ensilage to a point of discharge.

2. The device as set forth in claim 1 together with wall-scraping blades on said screw driving wheel.

3. The device as set forth in claim 2 together with a rake mounted on said radial arm adjacent said pipe.

4. An automatically guided ensilage unloader for round silos comprising a frame, a motor mounted on said frame, a blower housing mounted on said frame, a fan in said blower housing drivably connected to said motor, a traction roller journaled in said frame below said motor, a reduction gear train connecting said motor to said roller, a second housing mounted on said frame connected to said blower housing, a fodder pickup wheel journaled in said frame within said second housing, driving means connecting said pickup wheel to said motor, a support pipe adapted to be erected centrally within a silo, a radial arm pivotally secured at one end to said pipe, a telescoping section at the other end of said arm, a bearing carried by said arm on said telescoping section, a second bearing supported on the inner end of said arm in spaced relation to said pipe, a cross threaded screw rotatably supported in said bearings, a wheel on said screw adjacent said first-named bearing, a plurality of blades on the face of said wheel opposite said bearing, said blades being positioned in fan shaped relation and defining an opening between their inner ends, a ball bearing loosely secured between said blades in said opening, a spring in said telescoping section biasing said first-named bearing and said wheel outwardly, a cross thread screw follower slidably mounted on said screw, a hitch connecting said frame to said screw follower, and a flexible conduit pivotally mounted on said blower housing and adapted to convey blown ensilage to a point of discharge.

5. The device as set forth in claim 4 together with a rake mounted on said radial arm opposite to said screw, said rake constructed and arranged to rake ensilage from the area immediately adjacent said pipe and to at least partially support said radial arm above the ensilage.

6. The device as set forth in claim 4 together with a height adjusting means comprising a secondary roller pivotally secured to said frame between said traction roller and said fodder pickup wheel and disposed parallel thereto, and a lever operatively connected to said secondary roller for adjustably positioning it relative to the traction roller and the pickup wheel.

7. The device as set forth in claim 4 together with a door on the rear side of said second housing, and reversing means connected to said traction roller including a bracket supporting a reversing gear, and a flexible cable connecting said door with said bracket for opening said door upon movement of said bracket to reversing position.

8. For use with a self-propelled ensilage unloader, the improvement of a guide means comprising a pipe support adapted to be erected centrally in a silo, a radial arm pivotally connected at one end to said pipe support, a telescoping section at the other end of said arm, a cross threaded screw, bearing means on each end of said arm adapted to support said screw, a screw follower on said screw, drive means for said screw, and hitch means on said follower adapted to be connected to an ensilage unloader.

9. The device as set forth in claim 8 together with a wheel biased outwardly on said screw, adapted to be drivably rotated by contact with the ensilage being unloaded and bearing means on said wheel adapted to reduce friction of said wheel while in rubbing contact with a silo wall.

10. The device as set forth in claim 8 together with a rotating commutator on said pipe support comprising an insulated body having a centrally disposed aperture therethrough, a bolt transversing said aperture, connector means secured to one end of said bolt and being adapted and arranged to be connected to one side of a source of current, a second connector means on said body adapted and arranged to be connected to the other side of the current source, said second connector having a movable ring thereon electrically connected to a motor on the unloader, and a rotating contact movably secured to said body and electrically connecting said bolt at its other end to motor on the unloader.

References Cited in the file of this patent

UNITED STATES PATENTS

| | | |
|---|---|---|
| 1,269,668 | Woolcott | June 18, 1918 |
| 1,550,311 | Foster | Aug. 18, 1925 |
| 2,634,962 | Eglitis | Apr. 14, 1953 |